United States Patent
Liu

(10) Patent No.: US 11,363,561 B2
(45) Date of Patent: Jun. 14, 2022

(54) METHOD AND APPARATUS FOR REPORTING INFORMATION BY TERMINAL, AND COMPUTER STORAGE MEDIUM

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/931,852

(22) Filed: Jul. 17, 2020

(65) Prior Publication Data
US 2020/0351819 A1 Nov. 5, 2020

Related U.S. Application Data

(63) Continuation of application No. PCT/CN2018/073491, filed on Jan. 19, 2018.

(51) Int. Cl.
*H04L 12/18* (2006.01)
*H04W 68/00* (2009.01)
(Continued)

(52) U.S. Cl.
CPC ......... *H04W 68/005* (2013.01); *H04M 15/66* (2013.01); *H04W 76/11* (2018.02); *H04W 76/12* (2018.02); *H04W 84/12* (2013.01)

(58) Field of Classification Search
None
See application file for complete search history.

(56) References Cited

U.S. PATENT DOCUMENTS

2014/0140322 A1 5/2014 Brequigny et al.

FOREIGN PATENT DOCUMENTS

| CN | 106559777 A | 4/2017 |
|---|---|---|
| CN | 107018542 A | 8/2017 |

(Continued)

OTHER PUBLICATIONS

Huawei et al: "Pseudo CR on TS 23.502 for updating handover procedures with NF service operation invocations", 3GPP Draft; S2-176436-PCR_23502_Handover_Procedure_Update_With_NF_Service_Operations, 3rd Generation Partnership Project (3GPP), Mobile Competence Centre; 650, Route Des Lucioles; F-06921 Sophia-Ant, vol. SA WG2, No. Sophia Antipolis, France; Aug. 21, 2017-Aug. 25, 2017 Aug. 29, 2017(Aug. 29, 2017), XP051335825.

(Continued)

*Primary Examiner* — Gary Lafontant

(57) ABSTRACT

The present disclosure discloses a method and an apparatus for reporting information by a terminal, and a computer storage medium. The method includes: sending, by the terminal, a first message to a RAN entity, the first message including a first identifier and UE related information, so as to send a second message to a UPF entity through the RAN entity, the second message including the first identifier and the UE related information, and to send the UE related information to an SMF entity through the UPF entity after identifying the first identifier in the second message through the UPF entity, and then to send the UE related information to a PCF entity through the SMF entity.

11 Claims, 4 Drawing Sheets

(51) Int. Cl.
*H04W 76/12* (2018.01)
*H04W 76/11* (2018.01)
*H04M 15/00* (2006.01)
*H04W 84/12* (2009.01)

(56) References Cited

FOREIGN PATENT DOCUMENTS

| | | |
|---|---|---|
| CN | 107040674 A | 8/2017 |
| JP | 2019537334 A | 12/2019 |
| RU | 2573577 C1 | 1/2016 |
| WO | 2017133342 A1 | 8/2017 |
| WO | 2017189176 A2 | 11/2017 |
| WO | WO-2019114938 A1 * 6/2019 ........... H04L 67/141 |

OTHER PUBLICATIONS

3GPP TS 23.503 V0.2.0 (Sep. 2017); 3rd Generation Partnership Project Technical Specification Group Services and System Aspects; Policy and Charging Control Framework for the 5G System; Stage 2(Release 15).
The Notice of Allowance of corresponding Russian application No. 2020127378, dated Jun. 9, 2021.
International Search Report(ISR) dated Sep. 27, 2018 for Application No. PCT/CN2018/073491.
The first Office Action of corresponding Indian application No. 20201703549, dated Aug. 27, 2021.
The first Office Action of corresponding Indian application No. 10-2020-7023786, dated Oct. 26, 2021.
The EESR of corresponding European application No. 18901527.4, dated Dec. 22, 2020.
Huawei et al: "Pseudo CR on TS 23.502 for updating handover procedures with NF service operation invocations", 3GPP Draft; S2-176436-PCR_23502_Handover_Procedure_Update_With_NF_Service_Operations, 3rd Generation Partnership Project (3GPP), Mobile Competence Centre; 650, Route Des Lucioles; F-06921 Sophia-Ant, vol. SAWG2, No. Sophia Antipolis, France; Aug. 21, 2017-Aug. 25, 2017 Aug. 29, 2017 (Aug. 29, 2017), XP051335825.
ZTE et al:" TS 23.502 Update in N2 based Inter NG-RAN node handover procedure". 3GPP Draft; S2-176168 TS23502 N2 Handover Procedure, 3RD Generation Partnership Project (3GPP), Mobile Competence Centre; 650, Route Des Lucioles; F-06921 Sophia-Antipolis Cedex; France, vol. SA WG2, No. Sophia Antipolis, France; Aug. 21, 2017-Aug. 25, 2017 Aug. 29, 2017 (Aug. 29, 2017), XP051335606.
Qualcomm Incorporated:" Benefits of UE assisted information and solutions", 3GPP Draft; R2-1708294, 3RD Generation Partnership Project (3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017 Aug. 20, 2017 (Aug. 20, 2017), XP051318190.
The first Office Action of corresponding Japanese application No. 2020-540303, dated Jan. 6, 2022.
Intel, ZTE, ETRI, KDDI, and Clarification on LADN related aspects—TS 23.502[online]3GPP TSG SA W82 #125 S2-180442,Internet<URL:https://www.3gpp.org/ftp/tsg_sa/WG2_Arch/TSGS2_125_Gothenburg/Docs/S2-180442.zip>, Jan. 18, 2018.

* cited by examiner

METHOD AND APPARATUS FOR REPORTING INFORMATION BY TERMINAL, AND COMPUTER STORAGE MEDIUM

CROSS-REFERENCE TO RELATED APPLICATIONS

This application is a continuation of International Application No. PCT/CN2018/073491, filed on Jan. 19, 2018, the disclosure of which is hereby incorporated by reference in its entirety.

TECHNICAL FIELD

The present disclosure relates to the field of wireless communication technologies and, in particular, to a method and an apparatus for reporting information by a terminal, and a computer storage medium.

BACKGROUND

With the advent of big data technology, it is very important to change the policy of a terminal according to the real-time situation of the terminal. Currently, the terminal cannot report data related to wireless communication, such as a current location of the terminal, current data usage of the terminal, etc. The terminal can only report application-related data to an OTT (Over The Top) server.

A problem to be solved is how the terminal reports data related to wireless communication to a core network.

SUMMARY

In order to solve the above technical problem, embodiments of the present disclosure provide a method and an apparatus for reporting information by a terminal, and a computer storage medium.

A method for reporting information by a terminal according to an embodiment of the present disclosure includes:

receiving, by an access network (RAN) entity, a first message sent by the terminal, the first message including a first identifier and user equipment (UE) related information; and sending, by the RAN entity, a second message to a user plane function (UPF) entity, the second message including the first identifier and UE related information, so as to send the UE related information to a control plane entity through the UPF entity after identifying the first identifier in the second message through the UPF entity.

In an implementation, the control plane entity is a session management function (SMF) entity, and the UE related information is sent to a policy control function (PCF) entity through the SMF entity.

In an implementation, an access stratum (AS, Access Stratum) header of the first message carries the first identifier, and a body of the first message carries the UE related information.

In an implementation, the AS header of the first message is an Service Data Adaptation Protocol (SDAP) layer header, a packet data convergence protocol (PDCP) layer header, a radio link control (RLC) layer header, a media access control (MAC) layer header, or a physical (PHY) layer header.

In an implementation, a GPRS tunneling protocol (GTP) layer header of the second message carries the first identifier, and a body of the second message carries the UE related information.

In an implementation, the UE related information includes at least one of the following:

UE route selection policy (URSP) information, wireless local area network selection policy (WLANSP, WLAN Selection Policy) information, and UE status information.

A method for reporting information by a terminal according to an embodiment of the present disclosure includes:

sending, by the terminal, a first message to a RAN entity, the first message including a first identifier and UE related information, so as to send a second message to a UPF entity through the RAN entity, the second message including the first identifier and the UE related information, and to send the UE related information to a control plane entity through the UPF entity after identifying the first identifier in the second message through the UPF entity.

In an implementation, the control plane entity is an SMF entity, and the UE related information is sent to a PCF entity through the SMF entity.

In an implementation, an AS header of the first message carries the first identifier, and a body of the first message carries the UE related information.

In an implementation, the AS header of the first message is an SDAP layer header, a PDCP layer header, an RLC layer header, a MAC layer header, or a PHY layer header.

In an implementation, before sending, by the terminal, the first message to the RAN entity, the method further includes:

sending, by the terminal, a first indication message to the SMF entity, so as to send a session update message to the UPF entity through the SMF entity, and to perform a session update through the UPF entity;

where the first indication message and the session update message carry the first identifier, and the first identifier is used to indicate that the UE related information needs to be sent to the PCF entity; and the session update message is used to trigger the UPF entity to perform session update, so that the UPF entity is capable of identifying the first identifier in the second message sent by the RAN entity and sending the UE related information to the SMF entity, after performing the session update.

In an implementation, the UE related information includes at least one of the following:

URSP information, WLANSP information, and UE status information.

A method for reporting information by a terminal according to an embodiment of the present disclosure includes:

receiving, by a UPF entity, a second message sent by a RAN entity, the second message including a first identifier and UE related information; and sending, by the UPF entity, the UE related information to a control plane entity, after identifying the first identifier in the second message.

In an implementation, the control plane entity is an SMF entity, and the UE related information is sent to a PCF entity through the SMF entity.

In an implementation, a GTP layer header of the second message carries the first identifier, and a body of the second message carries the UE related information.

In an implementation, before receiving, by the UPF entity, the second message sent by the RAN entity, the method further includes:

receiving, by the UPF entity, a session update message sent by the SMF entity and performing a session update, where the UPF entity is capable of identifying the first identifier in the second message sent by the RAN entity and sending the UE related information to the SMF entity, after performing the session update.

In an implementation, the UE related information includes at least one of the following:

URSP information, WLANSP information, and UE status information.

An apparatus for reporting information by a terminal according to an embodiment of the present disclosure includes:

a receiving unit, configured to receive a first message sent by the terminal, the first message including a first identifier and UE related information; and a sending unit, configured to send a second message to a UPF entity, the second message including the first identifier and the UE related information, so as to send the UE related information to a control plane entity through the UPF entity after identifying the first identifier in the second message through the UPF entity.

In an implementation, the control plane entity is an SMF entity, and the UE related information is sent to a PCF entity through the SMF entity.

In an implementation, an AS header of the first message carries the first identifier, and a body of the first message carries the UE related information.

In an implementation, the AS header of the first message is an SDAP layer header, a PDCP layer header, an RLC layer header, a MAC layer header, or a PHY layer header.

In an implementation, a GTP layer header of the second message carries the first identifier, and a body of the second message carries the UE related information.

In an implementation, the UE related information includes at least one of the following:

URSP information, WLANSP information, and UE status information.

An apparatus for reporting information by a terminal according to an embodiment of the present disclosure includes:

a first sending unit, configured to send a first message to a RAN entity, the first message including a first identifier and UE related information, so as to send a second message to a UPF entity through the RAN entity, the second message including the first identifier and the UE related information, and to send the UE related information to a control plane entity through the UPF entity after identifying the first identifier in the second message through the UPF entity.

In an implementation, the control plane entity is an SMF entity, and the UE related information is sent to a PCF entity through the SMF entity.

In an implementation, an AS header of the first message carries the first identifier, and a body of the first message carries the UE related information.

In an implementation, the AS header of the first message is an SDAP layer header, a PDCP layer header, an RLC layer header, a MAC layer header, or a PHY layer header.

In an implementation, the apparatus further includes:

a second sending unit, configured to send a first indication message to the SMF entity, so as to send a session update message to the UPF entity through the SMF entity, and to perform a session update through the UPF entity;

where the first indication message and the session update message carry the first identifier, and the first identifier is used to indicate that the UE related information needs to be sent to the PCF entity; and the session update message is used to trigger the UPF entity to perform the session update, so that the UPF entity is capable of identifying the first identifier in the second message sent by the RAN entity and sending the UE related information to the SMF entity, after performing the session update.

In an implementation, the UE related information includes at least one of the following:

URSP information, WLANSP information, and UE status information.

An apparatus for reporting information by a terminal according to an embodiment of the present disclosure includes:

a first receiving unit, configured to receive a second message sent by a RAN entity, the second message including a first identifier and UE related information;

an identifying unit, configured to identify the first identifier in the second message; and a sending unit, configured to send the UE related information to a control plane entity.

In an implementation, the control plane entity is an SMF entity, and the UE related information is sent to a PCF entity through the SMF entity.

In an implementation, a GTP layer header of the second message carries the first identifier, and a body of the second message carries the UE related information.

In an implementation, the apparatus further includes:

a second receiving unit, configured to receive a session update message sent by the SMF entity; and a session updating unit, configured to perform a session update, where the UPF entity is capable of identifying the first identifier in the second message sent by the RAN entity and sending the UE related information to the SMF entity, after performing the session update.

In an implementation, the UE related information includes at least one of the following:

URSP information, WLANSP information, and UE status information.

A computer storage medium according to an embodiment of the present disclosure has stored thereon computer executable instructions that, when executed by a processor, implement the above methods for reporting information by a terminal.

In the technical solutions of the embodiments of the present disclosure, the terminal sends a first message to a RAN entity, the first message including a first identifier and UE related information, so as to send a second message to a UPF entity through the RAN entity, the second message including the first identifier and the UE related information, and to send the UE related information to a control plane entity through the UPF entity after identifying the first identifier in the second message through the UPF entity, and then to send the UE related information to a PCF entity through the SMF entity. Using the technical solutions of the embodiments of the present disclosure, the terminal can report the UE related information to the PCF entity of the core network through the user plane, enhancing the management of the terminal by the core network.

BRIEF DESCRIPTION OF DRAWINGS

The drawings described here are used to provide a further understanding of the present disclosure and constitute a part of the present disclosure. The schematic embodiments of the present disclosure and the descriptions thereof are used to explain the present disclosure but do not constitute an improper limitation on the present disclosure. In the drawings.

DESCRIPTION OF EMBODIMENTS

In order to understand the features and technical contents of embodiments of the present disclosure in more detail, the implementation of the embodiments of the present disclosure will be described in detail below with reference to the drawings. The accompanying drawings are for reference only and are not intended to limit the embodiments of the present disclosure.

Figure 1:
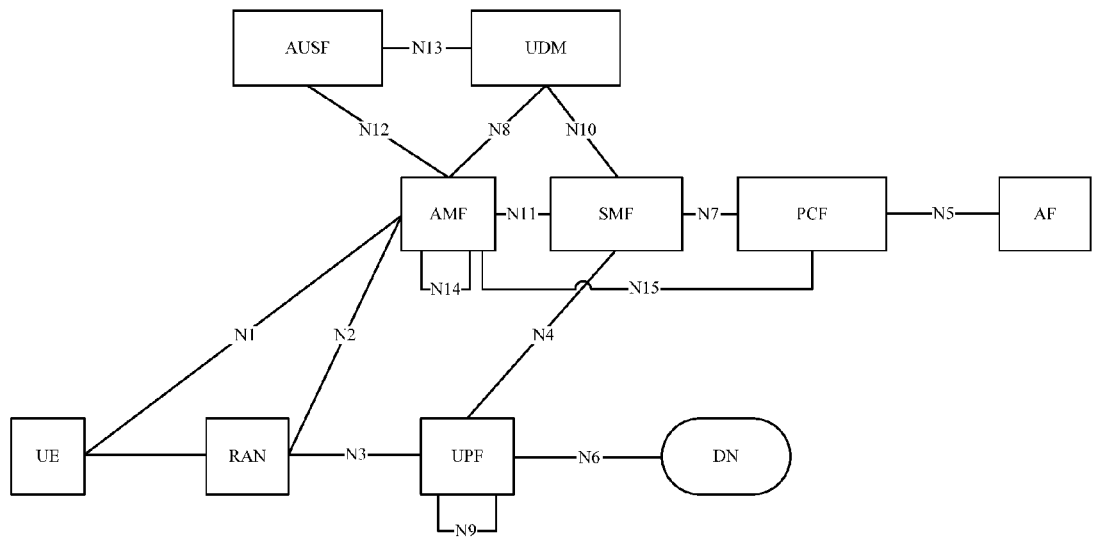
FIG. 1 is a diagram of a system architecture of a 5G network according to an embodiment of the present disclosure.

FIG. 1 is a diagram of a system architecture of a 5G network according to an embodiment of the present disclosure. As shown in FIG. 1, devices involved in the 5G network system includes:

a terminal (also known as UE, User Equipment), a radio access network (RAN, Radio Access Network) entity, a user plane function (UPF) entity, a data network (DN), a core access and mobility management function (AMF), a session management function (SMF) entity, a policy control function (PCF) entity, an application function (AF), an authentication server function (AUSF), and a unified data management (UDM).

The example of FIG. 1 described above is only an example of a network architecture for implementing the embodiment of the present disclosure, and the embodiment of the present disclosure is not limited to the above network structure of FIG. 1.

Figure 2:
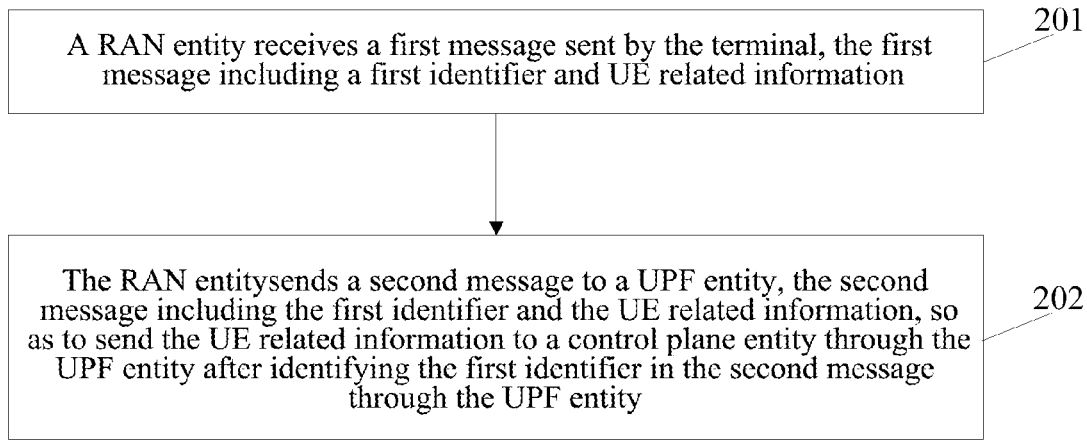
FIG. 2 is a first flowchart of a method for reporting information by a terminal according to an embodiment of the present disclosure.

FIG. 2 is a first flowchart of a method for reporting information by a terminal according to an embodiment of the present disclosure. The method for reporting information by a terminal in this embodiment is applied to the RAN entity side. As shown in FIG. 2, the method for reporting information by a terminal includes the following steps.

Step 201: a RAN entity receives a first message sent by the terminal, the first message including a first identifier and UE related information.

In an implementation, the terminal can be any device capable of communicating with a network, such as a mobile phone, a tablet computer, a notebook computer, and a desktop computer.

In an implementation, the UE related information can be any information related to the status of the terminal, and the UE related information includes at least one of the following: URSP information, WLANSP information, UE status information (such as UE current power, UE location Information, and UE movement speed).

In an implementation, the first message is transmitted through a user plane protocol between the RAN entity and the terminal.

In an implementation an AS header of the first message carries the first identifier, and the body of the first message carries the UE related information.

In an implementation, the AS header of the first message is an SDAP layer header, a PDCP layer header, an RLC layer header, a MAC layer header, or a PHY layer header. Preferably, the AS layer header of the first message is a PDCP layer header.

Step 202: the RAN entity sends a second message to a UPF entity, the second message including the first identifier and the UE related information, so as to send the UE related information to a control plane entity through the UPF entity after identifying the first identifier in the second message through the UPF entity.

In an implementation, the control plane entity is an SMF entity, and the UE related information is sent to a PCF entity through the SMF entity.

In an implementation, the second message is transmitted through a user plane protocol between the RAN entity and the UPF entity.

In an implementation, a GTP layer header of the second message carries the first identifier, and the body of the first message carries the UE related information.

In an implementation, after receiving the second message, the UPF entity identifies that the second message carries the first identifier, so that it can be known that the UE related information needs to be sent to the SMF entity, and the UE related information is sent to the PCF entity through the SMF entity.

In the technical solution of the embodiment of the present disclosure, a new identifier (that is, the first identifier) is added to the PDCP layer header on the terminal side and the GTP-U header on the RAN entity side. After receiving the identifier, the UPF entity will transmit the content of the data packet (that is, the UE related information) to the SMF entity, and the SMF entity can further transmit it to the PCF entity.

Figure 3:
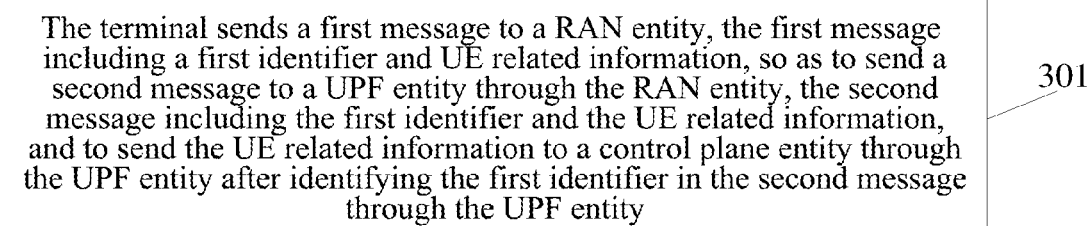
FIG. 3 is a second flowchart of a method for reporting information by a terminal according to an embodiment of the present disclosure.

FIG. 3 is a second flowchart of a method for reporting information by a terminal according to an embodiment of the present disclosure. The method for reporting information by a terminal in this embodiment is applied to the terminal side. As shown in FIG. 3, the method for reporting information by a terminal includes the following steps.

Step 301: the terminal sends a first message to a RAN entity, the first message including a first identifier and UE related information, so as to send a second message to a UPF entity through the RAN entity, the second message including the first identifier and the UE related information, and to send the UE related information to a control plane entity through the UPF entity after identifying the first identifier in the second message through the UPF entity.

In an implementation, the control plane entity is an SMF entity, and the UE related information is sent to a PCF entity through the SMF entity.

In an implementation, the terminal can be any device capable of communicating with a network, such as a mobile phone, a tablet computer, a notebook computer, and a desktop computer.

In an implementation, the UE related information can be any information related to the status of the terminal, and the UE related information includes at least one of the following: URSP information, WLANSP information, UE status information (such as UE current power, UE location Information, and UE movement speed).

In an implementation, the first message is transmitted through a user plane protocol between the RAN entity and the terminal.

In an implementation, an AS header of the first message carries the first identifier, and the body of the first message carries the UE related information.

In an implementation, the AS header of the first message is an SDAP layer header, a PDCP layer header, an RLC layer header, a MAC layer header, or a PHY layer header In an implementation, the first identifier can be an identifier negotiated between the terminal and the network side, or can be an identifier self-defined by the terminal. If the first identifier is an identifier negotiated between the terminal and the network side, the terminal can directly send the first message to the RAN entity, and the RAN entity sends the second message to the UPF entity; the UPF entity sends the UE related information to the SMF entity after identifying the first identifier in the second message, and then the UE related information is forwarded to the PCF entity. If the first identifier is an identifier self-defined by the terminal, before the terminal sends the first message to the RAN entity, the method further includes that:

the terminal sends a first indication message to the SMF entity, so as to send a session update message to the UPF entity through the SMF entity, and to perform a session update through the UPF entity;

where the first indication message and the session update message carry the first identifier, and the first identifier is used to indicate that the UE related information needs to be sent to the PCF entity; and the session update message is used to trigger the UPF entity to perform the session update, so that the UPF entity could identify the first identifier in the second message sent by the RAN entity and send the UE related information to the SMF entity after performing the session update.

In specific implementation, the terminal notifies, through an SM-NAS message (such as PDU Session Modification), the SMF entity of the first identifier and an indication that UE related information needs to be transmitted to the PCF entity. The SMF entity then sends the first identifier to the UPF entity through a session update message. The UPF entity updates the session and installs a filter capable of identifying the first identifier on the corresponding session. After the PDU session modification is completed by the UPF entity, the terminal starts to encapsulate the UE related information that needs to be transmitted, and marks the first identifier onto the PDCP layer header. The RAN entity adds the first identifier onto the corresponding GTP (such as GTP-U) layer header when performing the conversion into a GTP packet. The UPF entity identifies the first identifier, and then sends the UE related information to the SMF entity. The SMF entity further sends the UE related information to the PCF entity. During this period, the SMF entity can sense the UE related information.

Figure 4:
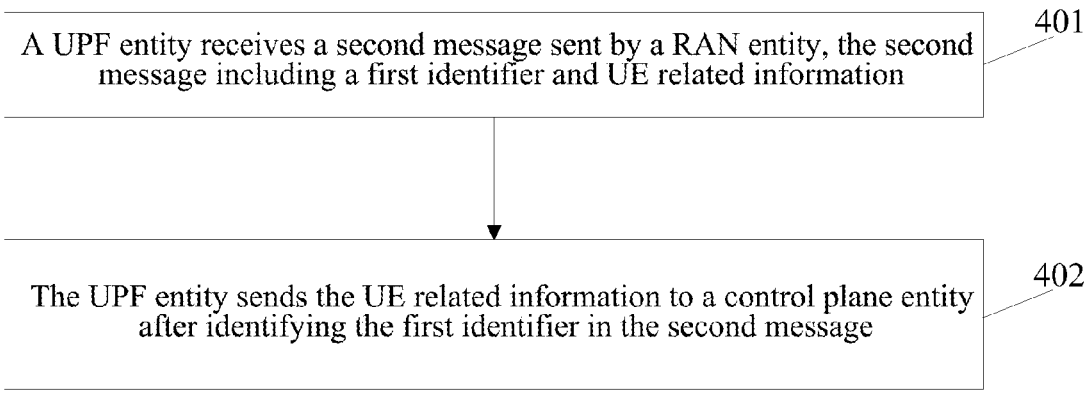
FIG. 4 is a third flowchart of a method for reporting information by a terminal according to an embodiment of the present disclosure.

FIG. 4 is a third flowchart of a method for reporting information by a terminal according to an embodiment of the present disclosure. The method for reporting information by the terminal in this embodiment is applied to the UPF entity side. As shown in FIG. 4, the method for reporting information by a terminal includes the following steps.

Step 401: a UPF entity receives a second message sent by a RAN entity, the second message including a first identifier and UE related information.

In an implementation, the UE related information can be any information related to the status of the terminal, and the UE related information includes at least one of the following: URSP information, WLANSP information, UE status information (such as UE current power, UE location Information, and UE movement speed).

In an implementation, the second message is transmitted through a user plane protocol between the RAN entity and the UPF entity.

In an implementation, a GTP layer header of the second message carries the first identifier, and the body of the first message carries the UE related information.

Step 402: the UPF entity sends the UE related information to a control plane entity after identifying the first identifier in the second message.

In an implementation, the control plane entity is an SMF entity, and the UE related information is sent to a PCF entity through the SMF entity.

In an implementation, the first identifier can be an identifier negotiated between the terminal and the network side, or can be an identifier self-defined by the terminal. If the first identifier is an identifier negotiated between the terminal and the network side, the terminal can directly send the first message to the RAN entity, and the RAN entity sends the second message to the UPF entity; the UPF entity sends the UE related information to the SMF entity after identifying the first identifier in the second message, and then the UE related information is forwarded to the PCF entity. If the first identifier is an identifier self-defined by the terminal, before the UPF entity receives the second message sent by the RAN entity, the method further includes that:

the UPF entity receives a session update message sent by the SMF entity and performs a session update, where the UPF entity could identify the first identifier in the second message sent by the RAN entity and send the UE related information to the SMF entity after performing the session update.

Figure 5:
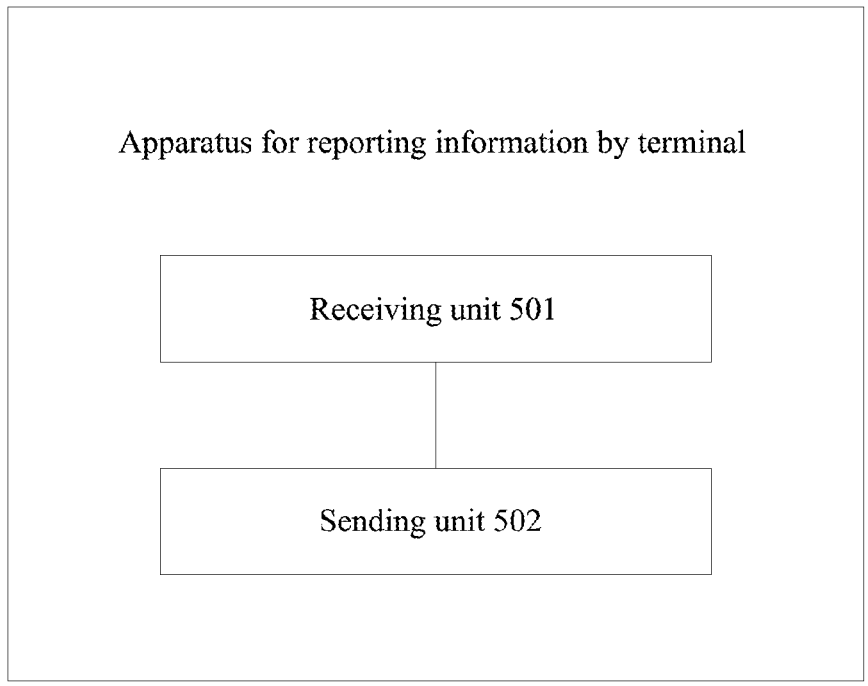
FIG. 5 is a first schematic structural diagram of an apparatus for reporting information by a terminal according to an embodiment of the present disclosure.

FIG. 5 is a first schematic structural diagram of an apparatus for reporting information by a terminal according to an embodiment of the present disclosure. The apparatus for reporting information by a terminal is applied to the RAN entity side. As shown in FIG. 5, the apparatus for reporting information by a terminal includes:

a receiving unit 501, configured to receive a first message sent by the terminal, the first message including a first identifier and UE related information; and a sending unit 502, configured to send a second message to the UPF entity, the second message including the first identifier and the UE related information, so as to send the UE related information to a control plane entity through the UPF entity after identifying the first identifier in the second message through the UPF entity.

In an implementation, the control plane entity is an SMF entity, and the UE related information is sent to a PCF entity through the SMF entity.

In an implementation, an AS header of the first message carries the first identifier, and the body of the first message carries the UE related information.

In an implementation, the AS header of the first message is an SDAP layer header, a PDCP layer header, an RLC layer header, a MAC layer header, or a PHY layer header.

In an implementation, a GTP layer header of the second message carries the first identifier, and the body of the first message carries the UE related information.

In an implementation, the UE related information includes at least one of the following:

URSP information, WLANSP information, and UE status information.

Those skilled in the art should understand that the implementation function of each unit in the apparatus for reporting information by a terminal shown in FIG. 5 can be understood by referring to the related description of the aforementioned method for reporting information by a terminal. The function of each unit in the apparatus for reporting information by a terminal shown in FIG. 5 can be implemented by a program running on a processor, or can be implemented by a specific logic circuit.

Figure 6:
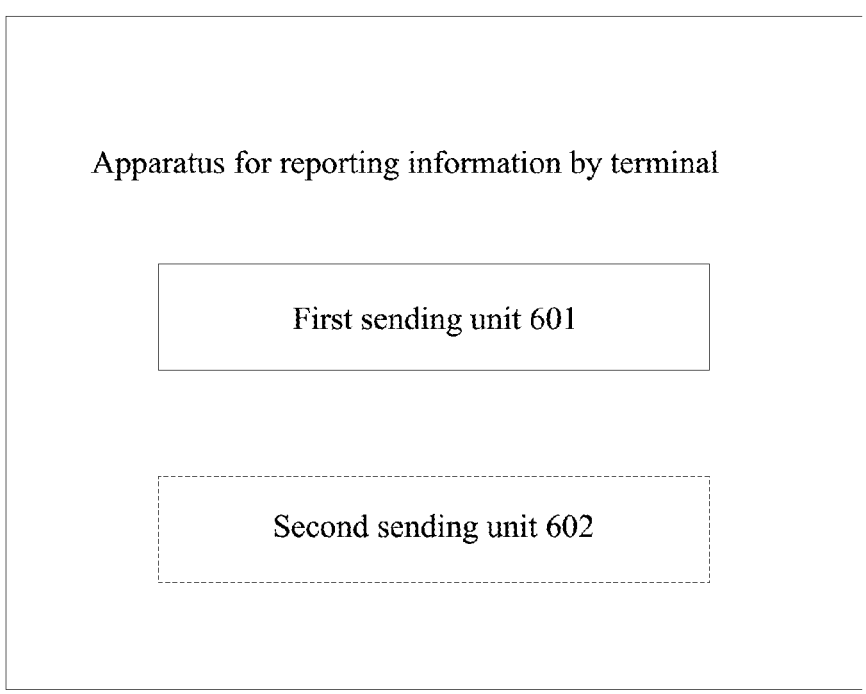
FIG. 6 is a second schematic structural diagram of an apparatus for reporting information by a terminal according to an embodiment of the present disclosure.

FIG. 6 is a second schematic structural diagram of an apparatus for reporting information by a terminal according to an embodiment of the present disclosure. The apparatus for reporting information by a terminal is applied to the terminal side. As shown in FIG. 6, the apparatus for reporting information by a terminal includes:

a first sending unit 601, configured to send a first message to a RAN entity, the first message including a first identifier and UE related information, so as to send a second message to a UPF entity through the RAN entity, the second message including the first identifier and the UE related information, and to send the UE related information to a control plane entity through the UPF entity after identifying the first identifier in the second message through the UPF entity.

In an implementation, the control plane entity is an SMF entity, and the UE related information is sent to a PCF entity through the SMF entity.

In an implementation, an access stratum (AS) header of the first message carries the first identifier, and the body of the first message carries the UE related information.

In an implementation, the AS header of the first message is an SDAP layer header, a PDCP layer header, an RLC layer header, a MAC layer header, or a PHY layer header.

In an implementation, the apparatus further includes:

a second sending unit 602, configured to send a first indication message to the SMF entity, so as to send a session update message to the UPF entity through the SMF entity, and to perform a session update through the UPF entity;

where the first indication message and the session update message carry the first identifier, and the first identifier is used to indicate that the UE related information needs to be sent to the PCF entity; and the session update message is used to trigger the UPF entity to perform the session update, so that the UPF entity could identify the first identifier in the second message sent by the RAN entity and send the UE related information to the SMF entity after performing the session update.

In an implementation, the UE related information includes at least one of the following:

URSP information, WLANSP information, and UE status information.

Those skilled in the art should understand that the implementation function of each unit in the apparatus for reporting information by a terminal shown in FIG. 6 can be understood by referring to the related description of the aforementioned method for reporting information by a terminal. The function of each unit in the apparatus for reporting information by a terminal shown in FIG. 6 can be implemented by a program running on a processor, or can be implemented by a specific logic circuit.

Figure 7:
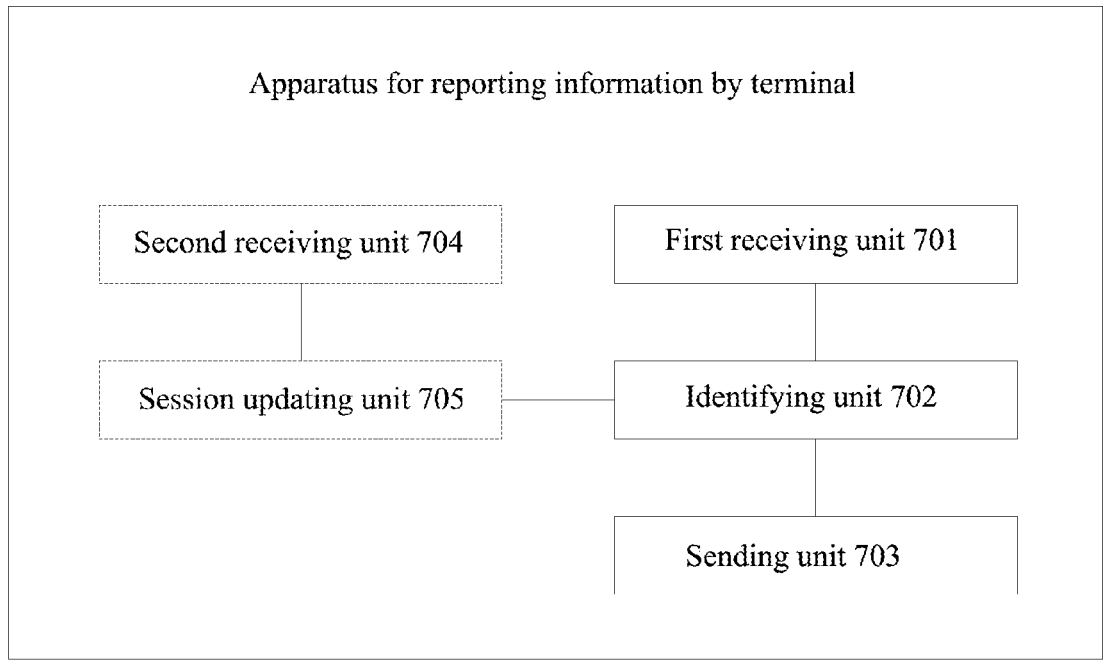
FIG. 7 is a third structural schematic diagram of an apparatus for reporting information by a terminal according to an embodiment of the present disclosure.

FIG. 7 is a third structural schematic diagram of an apparatus for reporting information by a terminal according to an embodiment of the present disclosure. The apparatus for reporting information by a terminal is applied to the UPF entity side. As shown in FIG. 7, the apparatus for reporting information by a terminal includes:

a first receiving unit 701, configured to receive a second message sent by a RAN entity, the second message including a first identifier and UE related information;

an identifying unit 702, configured to identify the first identifier in the second message; and a sending unit 703, configured to send the UE related information to a control plane entity.

In an implementation, the control plane entity is an SMF entity, and the UE related information is sent to a PCF entity through the SMF entity.

In an implementation, a GTP layer header of the second message carries the first identifier, and the body of the first message carries the UE related information.

In an implementation, the apparatus further includes:

a second receiving unit 704, configured to receive a session update message sent by the SMF entity; and a session updating unit 705, configured to perform a session update, where the UPF entity could identify the first identifier in the second message sent by the RAN entity and send the UE related information to the SMF entity after performing the session update.

In an implementation, the UE related information includes at least one of the following:

URSP information, WLANSP information, and UE status information.

Those skilled in the art should understand that the implementation function of each unit in the apparatus for reporting information by a terminal shown in FIG. 7 can be understood by referring to the related description of the aforementioned method for reporting information by a terminal. The function of each unit in the apparatus for reporting information by a terminal shown in FIG. 7 can be implemented by a program running on a processor, or can be implemented by a specific logic circuit.

If the above apparatuses for reporting information by a terminal in the embodiments of the present disclosure are implemented in the form of software function modules and sold or used as an independent product, they can also be stored in a computer readable storage medium. Based on such understanding, the technical solutions of the embodiments of the present disclosure can be embodied in the form of a software product in essence or the part that contributes to the prior art can be embodied in the form of a software product. The computer software product is stored in a storage medium and includes several instructions for causing a computer device (which can be a personal computer, a server, or a network device, etc.) to perform all or part of the methods described in the embodiments of the present disclosure. The foregoing storage medium includes various media that can store program codes, such as a U disk, a mobile hard disk, a read only memory (ROM), a magnetic disk, or an optical disk. In this way, the embodiments of the present disclosure are not limited to any specific combination of hardware and software.

Correspondingly, an embodiment of the present disclosure further provides a computer storage medium which has stored thereon computer executable instructions that, when executed by a processor, implement the above methods for reporting information by a terminal.

Figure 8:
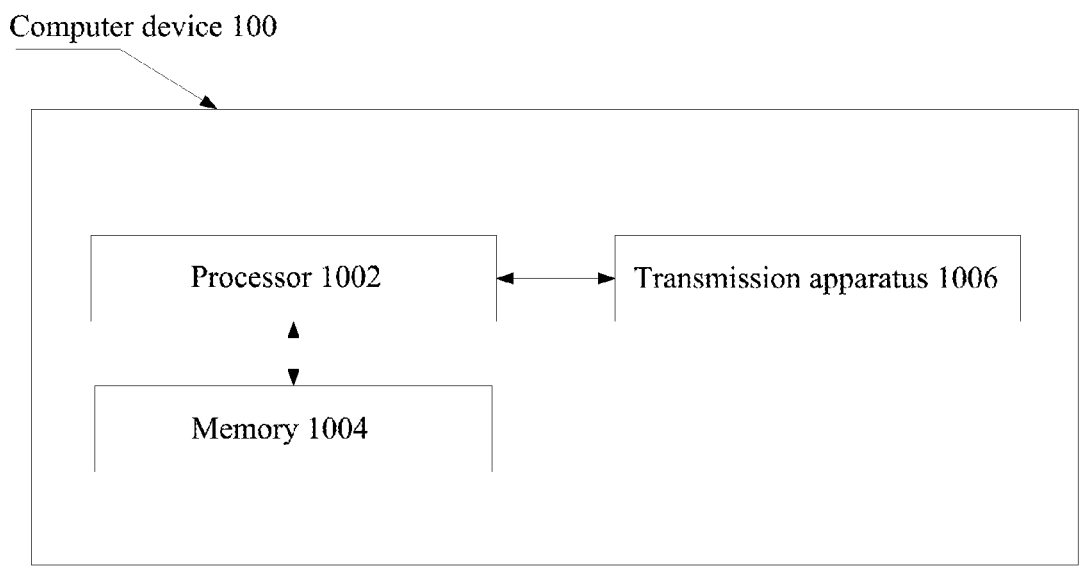
FIG. 8 is a schematic structural diagram of a computer device according to an embodiment of the present disclosure.

FIG. 8 is a schematic structural diagram of a computer device according to an embodiment of the present disclosure. The computer device may be a terminal or a network device. As shown in FIG. 8, the computer device 100 can include one or more (only one shown in the figure) processors 1002 (which can include, but are not limited to, a processing apparatus such as a micro controller unit (MCU) or a field programmable gate array (FPGA)), a memory 1004 for storing data, and a transmission apparatus 1006 for communication functions. Those skilled in the art can understand that the structure shown in FIG. 8 is only schematic, and does not limit the structure of the above computer device 100. For example, the computer device 100 can also include more or fewer components than those shown in FIG. 8, or have a different configuration from that shown in FIG. 8.

The memory 1004 can be used to store software programs and modules of application software, such as program instructions/modules corresponding to the methods in the embodiments of the present disclosure. The processor 1002 executes various functional applications and data processing, that is, implementing the above methods, by running the software programs and modules stored in the memory 1004. The memory 1004 can include a high-speed random access memory, and can further include a non-volatile memory, such as one or more magnetic storage apparatuses, flash memories, or other non-volatile solid-state memories. In some examples, the memory 1004 can further include memories remotely disposed with respect to the processor 1002, and these remote memories can be connected to the computer device 100 through a network. Examples of the above network include, but are not limited to, the Internet, an intranet, a local area network, a mobile communication network, and combinations thereof.

The transmission apparatus 1006 is used to receive or send data via a network. The specific examples of the above network can include a wireless network provided by a communication provider of the computer device 100. In an example, the transmission apparatus 1006 includes a network interface controller (NIC), which can be connected to other network devices through a base station so as to communicate with the Internet. In an example, the transmission apparatus 1006 can be a radio frequency (RF) module which is used to communicate with the Internet in a wireless manner.

The technical solutions described in the embodiments of the present disclosure can be arbitrarily combined without conflict.

In the several embodiments provided in the present disclosure, it should be understood that the disclosed methods and smart devices can be implemented in other ways. The device embodiments described above are merely illustrative, e.g., the division of the units is only a division in terms of logical functions, and there could be other forms of division in practical implementation. For example, a plurality of units or components can be combined or can be integrated into another system, or some features can be ignored or not be performed. For another, the mutual coupling or direct coupling or communication connection of various components as shown or discussed can be indirect coupling or communication connection via some interfaces, devices or units, and can be electrical, mechanical or in other forms.

The units described above as separate components may be or not be separated physically, and the components shown as units may be or not be physical units, i.e., they can be located in one place, or can be distributed on a plurality of network elements. Some or all units can be selected to achieve the purpose of the solutions of the embodiments according to the actual needs.

In addition, the functional units in the embodiment of the present disclosure may be integrated in one second processing unit, or each unit may be separately used as a unit, or two or more units may be integrated in one unit. The above integrated unit may be implemented in the form of hardware, or in the form of hardware plus software functional units.

The above are only specific embodiments of the present disclosure, and do not limit the protection scope of the present disclosure. Any person skilled in the art can easily think of changes or replacements within the technical scope disclosed by the present disclosure, which should be covered by the protection scope of the present disclosure.

What is claimed is:

1. A method for reporting terminal information, comprising:
   receiving, by a user plane function (UPF) entity, a second message sent by a radio access network (RAN) entity, the second message comprising a first identifier and user equipment (UE) related information; and
   sending, by the UPF entity, the UE related information to a session management function (SMF) entity, after identifying the first identifier in the second message;
   wherein before receiving, by the UPF entity, the second message sent by the RAN entity, the method further comprises:
   receiving, by the UPF entity, a session update or create message sent by the SMF entity and performing a session update or create, wherein the UPF entity is capable of identifying the first identifier in the second message sent by the RAN entity and sending the UE related information to the SMF entity, after performing, the session update or create.

2. The method according to claim 1, wherein the first identifier and the UE related information are carried by a first message which is sent to the RAN entity by a terminal.

3. The method according to claim 1, wherein the UE related information is sent to a policy control function (PCF) entity through the SMF entity.

4. The method according to claim 1, wherein a general packet radio service tunneling protocol (GFP) layer header of the second message carries the first identifier, and a body of the second message carries the UE related information.

5. The method according to claim 1, wherein the UE related information comprises at least one of the following:
   UE route selection policy (URSP) information, wireless local area network selection policy (WLANSP) information, and UE status information.

6. A non-transitory computer storage medium, having stored thereon computer executable instructions that, when executed by a processor, implement steps of the method of claim 1.

7. An apparatus for reporting terminal information, comprising:
   at least one processor;
   a transceiver connected with the at least one processor; and
   a memory connected with the at least one processor;
   wherein the instructions, when executed by the at least one processor, cause the at least one processor to:
   receive, through the transceiver, a second message sent by a radio access network (RAN) entity, the second message comprising a first identifier and user equipment (UE) related information;
   identify the first identifier in the second message; and
   send, through the transceiver, the UE related information to a session management function (SMF) entity;
   wherein the instructions further cause the at least one processor to:
   receive, through the transceiver a session update or create sent by the SMF entity; and
   perform a session update, wherein a user plane function (UPF) entity is capable of identifying the first identifier in the second message sent by the RAN entity and sending the UE related information to the SMF entity, after performing the session update.

8. The apparatus according to claim 7, wherein the first identifier and the UE related information are carried by a first message which is sent to the RAN entity by a terminal.

9. The apparatus according to claim 7, wherein the UE related information is sent to a policy control function (PCF) entity through the SMF entity.

10. The apparatus according to claim 7, wherein a general packet radio service tunneling protocol (GTP) layer header of the second message carries the first identifier, and a body of the second message carries the UE related information.

11. The apparatus according to claim 7, wherein the UE related information comprises at least one of the following:
UE route selection policy (URSP) information, wireless local area network selection policy (WLANSP) information, and UE status information.

\* \* \* \* \*